United States Patent [19]
Koff et al.

[11] Patent Number: 5,562,404
[45] Date of Patent: Oct. 8, 1996

[54] VANED PASSAGE HUB TREATMENT FOR CANTILEVER STATOR VANES

[75] Inventors: Steven G. Koff, Miami; Bernard L. Koff, Palm Beach Gardens; Bruce V. Lyon, Palm Beach Gardens; Mark G. Duer, Palm Beach Gardens, all of Fla.

[73] Assignee: United Technologies Corporation, Hartford, Conn.

[21] Appl. No.: 372,795

[22] Filed: Dec. 23, 1994

[51] Int. Cl.⁶ .................................................. F01D 11/08
[52] U.S. Cl. .................... 415/57.4; 415/58.7; 415/173.7; 415/914
[58] Field of Search ................................. 415/57.3, 57.4, 415/58.5, 58.7, 144, 173.1, 173.7, 914

[56] References Cited

U.S. PATENT DOCUMENTS

| | | | |
|---|---|---|---|
| 4,238,170 | 12/1980 | Robideau et al. | 415/173.7 |
| 5,230,605 | 7/1993 | Yamaguchi et al. | 415/58.5 |
| 5,282,718 | 2/1994 | Koff et al. | 415/57.3 |
| 5,308,225 | 5/1994 | Koff et al. | 415/57.3 |

FOREIGN PATENT DOCUMENTS

| | | | |
|---|---|---|---|
| 479427 | 1/1938 | United Kingdom | 415/914 |
| 504214 | 4/1939 | United Kingdom | 415/914 |

*Primary Examiner*—James Larson
*Attorney, Agent, or Firm*—Norman Friedland

[57] ABSTRACT

The cantilevered stator vanes of the compressor section of the gas turbine engine are treated by including a rotating hub having a by-pass passage for removing the low momentum fluid from the main air stream adjacent to the tips of the stator vanes in the compressor and returning it back into the main air stream after having treated the air while avoiding penalties and excessive heating. A plurality of vanes are circumferentially spaced in the by-pass passage for removing vortices and streamlining the flow before injected the air back into the airstream. The vane passage hub treatment is fabricated in a single cast piece in one embodiment, in a three ring configuration in another embodiment and in a segmented ring configuration in still another embodiment.

8 Claims, 6 Drawing Sheets

VANED PASSAGE HUB TREATMENT FOR CANTILEVER STATOR VANES

This invention was made under a U.S. Government contract and the Government has rights herein.

TECHNICAL FIELD

This invention relates to rotary machinery and gas turbine engines and more particularly to vaned passage treatment of the hub of a stator vane of the compressor section of the gas turbine engine.

BACKGROUND ART

U.S. Pat. No. 5,282,718 entitled "Case Treatment for Compressor Blades, granted to Steven G. Koff (coinventor of this patent application) and others on Feb. 1, 1994 and assigned to United Technologies Corporation the assignee common to this patent application, discloses and claims a vaned passage treatment for the compressor blades of the compressor rotor. When applied to the compressor rotor the vaned passage is disposed in the outer air seal or shroud that surrounds the rotating blades. The vaned passage at this location is in a flow field that has different characteristics than the characteristics of the flow field adjacent to the hub. The vaned passage treatment in the shroud surrounding the rotor hub, which is a stationary component of the engine, and the vaned passage treatment of the hub, which is a rotating component, will evidence a different loading pattern and have different stress considerations.

Additionally, and of paramount importance is that the blading geometry and the flow field associated with a rotor tip are very different from those of a stator hub in a modern aircraft engine compressor. These differences are demonstrated in the table presented immediately hereinbelow.

|                              | ROTOR TIP | STATOR HUB |
|------------------------------|-----------|------------|
| Camber angle                 | low       | high       |
| Blade stagger angle ref. to axial direction | high | low |
| Blade corner stalls          | no        | yes        |
| Inlet relative Mach No.      | high      | moderate   |

This invention to some extent relates to the technology disclosed in U.S. Pat. No. 5,282,718 in as much as both utilize vaned passages where the prior art teaches the use of vaned passages formed in a fixed component and the present invention relates to the vaned passages formed in a rotating component. As will become more evident from the description to follow hereinbelow these vaned passage treatments present their individualized problems and the use of vaned passage hub treatment is not an obvious extension of the vaned passage treatment disclosed in the prior art. As for example, in the rotating blade environment, the vaned passage treatment is merely added to the surrounding wall of the blades which is an existing engine component. When applied to an engine where hardware that can be modified to accommodate the vaned passage treatment is not available, such a configuration is not suggestive of utilizing vaned passage treatment in as much as extensive changes to the engine itself need to be made in order to accommodate such treatment. As for example, if the stator vanes are shrouded on the inner diameter, the entire stator vane, namely, the outer shroud attachment, the airfoil, and the structural details need to be changed due to changes in loading and stresses.

As one skilled in this technology realizes, compressor and fan stalls of axial flow gas turbine engines or rotating machinery typically initiate at the endwalls especially for the modern highly loaded compression systems. As described in the U.S. Pat. No. 5,282,718, supra, stalls that initiate in the rotor tip section of the fan or compressor can be delayed with the application of vaned passage casing treatment. The vaned passage casing treatment at this location substantially delays the onset of stall without impacting the component efficiency and the overall engine operating performance.

Hub treatment reduces weight and complexity of the compressor section of the engine, and hence, the overall engine by eliminating variable geometry stators and the number of stages in the compressor section. This also results in costs savings.

The vaned passage hub treatment of this invention will significantly delay stall that has the propensity of occurring at the stator hub sections of the high pressure compressor. The vaned passage treatment of this invention is designed to avoid penalties to the compressor efficiency. As noted above, the vaned passage hub treatment of this invention can eliminate variable vane stages in engines that utilize these types of vanes to meet operability requirements, thereby reducing weight and cost while improving reliability, durability and maintainability. The use of this type of treatment to the hub can also increase pressure ratio per compression stage which would decrease the length, weight, total number of components and complexity of the overall engine.

This invention contemplates in one of its embodiments casting the vaned passage hub treatment in a single unit. In another embodiment this invention contemplates fabricating the vaned passage hub treatment by machining the turning vanes integrally with the full ring hub. Fabricating the cap from a full ring that serves to house the outer diameter of the vaned passage which also defines the inner diameter boundary for the main flowpath of the engine's working fluid. A third full ring that is formed into a support member that supports and allows the installation of the cap. These three rings are diffusion bonded together to form the full hub assembly that is attached to the preceding rotor disk and is mounted contiguous with the tips of the vanes of a cantilevered mounted stator vane construction.

In still another embodiment, the hub is fabricated into a rotating disk assembly to be mounted in close proximity to the cantilevered stator row of vanes. The turning vanes are machined integrally into the rotating disk assembly. A cap formed from segmented arcuate members assembled end to end form together with the disk the treated passage. The cap defines the bottom boundary of the gas path of the engine's working fluid.

In all of the embodiments described hereinabove, the rotating-stationary relationship between the stator vane end and the hub shroud is required to 1) have a significant driving force for the gas path air to recirculate through the vaned passages and 2) be able to selectively siphon low momentum air from the main stream high momentum air in the gas path which reduces the opportunity to recirculate air unnecessarily and avoids efficiency penalties and excessive flow heating.

This invention contemplates coating the surface of the hub that is adjacent to the tips of the stator vanes with an abrasive material which grinds away the stator vane tips if these stator vanes should contact this surface while in operation. This is to assure that there will be a tight clearance between the vane ends and the hub contour.

SUMMARY OF THE INVENTION

An object of this invention is to provide for the stator vanes of rotating machinery, a rotating hub with vaned passage treatment for enhancing stall margin.

Another object of this invention is the provision of vaned passage hub treatment for a cantilevered stator vane that is characterized as enhancing stall margin without penalizing efficiency, eliminate variable vane stages thereby reducing weight and cost while improving reliability, durability and maintainability and increase pressure ratio per compression stages which would decrease length, weight, number of component parts and complexity in a gas turbine engine.

A feature of this invention is the provision of a rotating hub and cantilevered stator vane combination that includes a vaned passage treatment in the rotating hub and includes in one embodiment a single casted vaned passage hub treatment and in another embodiment turning vanes formed integrally in a full ring hub, a full ring cap forming the outer diameter of the vaned passage and an end full ring support member. In still another embodiment the cap is formed from segments that when installed define a full ring.

Another feature of this invention providing a coating of abrasive material on the inner diameter of the forward ring, the cap and the hub that are in proximity to the end of the vanes of the cantilevered stator vanes.

Another feature of this invention is diffusion bonding the ring, cap and hub portions to form an integral vaned passage hub treatment.

The foregoing and other features of the present invention will become more apparent from the following description and accompanying drawings.

DETAILED DESCRIPTION OF THE PREFERRED EMBODIMENT

While this invention is being described for use in a gas turbine engine, it will be understood that this invention has utility in other rotating machinery applications. As used herein the term vaned passage hub treatment is meant to include a passage in the rotating hub that includes an inlet and an outlet that communicates with the boundary layer of the air in the engine's gas path that is adjacent the tips of the vanes of a cantilevered mounted stator vane and the relationship between the stator blade end and hub shroud is required to: 1) have significant driving force for the gas path air to recirculate and 2) be able to selectively siphon low momentum air from mainstream high momentum air in the gas path which reduces the opportunity to recirculate air unnecessarily and avoids penalties and excessive heating.

Figure 1:
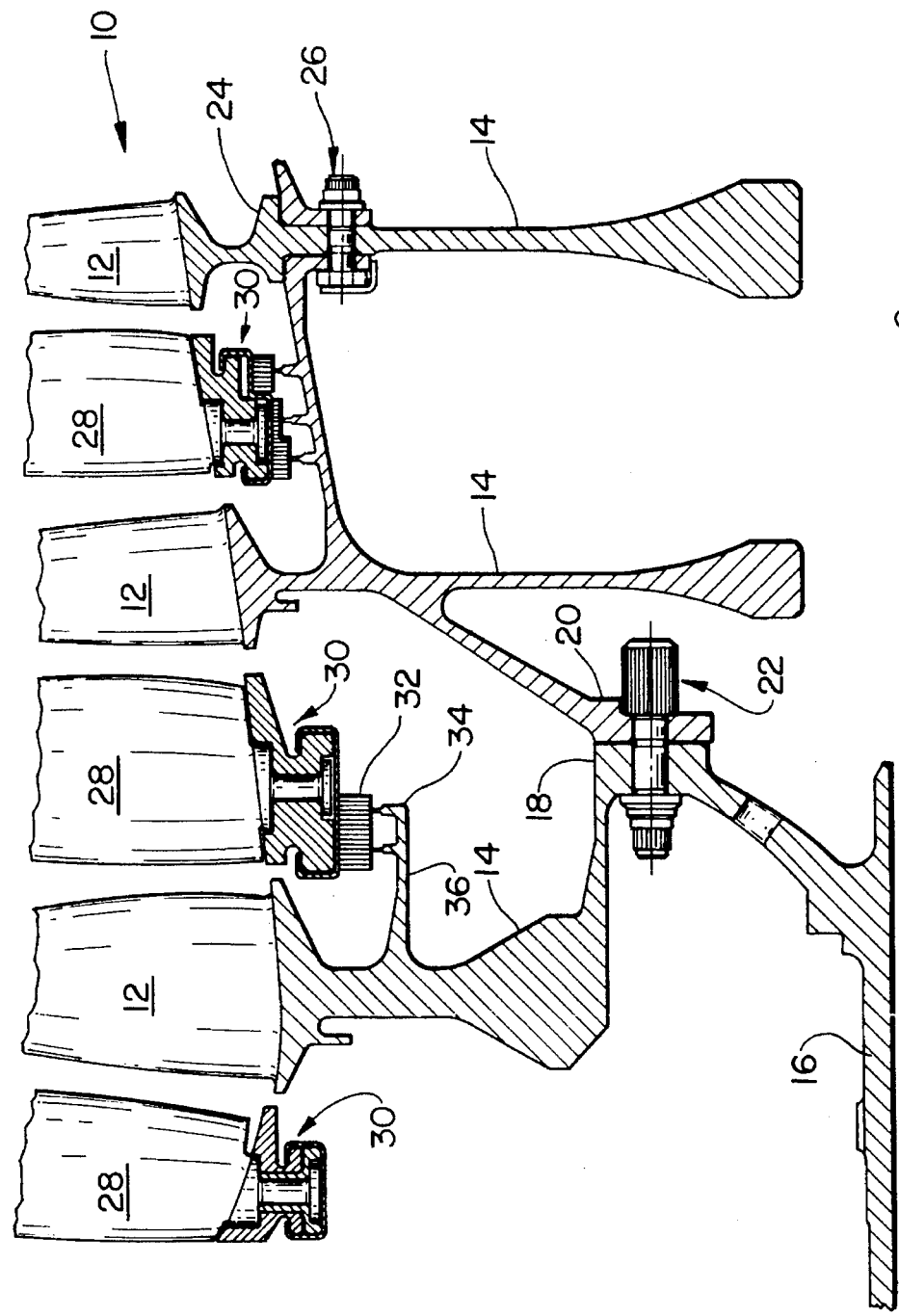
FIG. 1 is a fragmentary view of the prior art compressor section of the gas turbine engine.

The invention can best be understood by first referring to FIG. 1 which illustrates a prior art construction of a portion of the compressor section generally illustrated by reference numeral 10 of the gas turbine engine. The compressor blades 12 are supported to the rotor disk 14 for rotary motion about the engine's center line and are driven by the engine's main shaft 16. As noted in FIG. 1, the rotor disks are affixed to the shaft through various mechanical connections, where the disk on the immediate left side of the drawing is directly connected to the shaft 16 and the intermediate disk is connected through the flanges 18 and 20 which are secured to each other by a series of circumferentially spaced nuts and bolts generally indicated by reference numeral 22 (only one being shown). The remaining rotor disk is attached by the mating flange 24 by a plurality of circumferentially spaced nut and bolt assemblies generally indicated by reference numeral 26 (only one being shown). As is typical in this type of design, the stator vane assemblies 28 are disposed upstream of the blades of each of the rotors for directing the engine's working fluid (air) into the rotating blade for effectuating efficient compression of the air. The vanes are supported by an outer shroud (not shown) and an inner shroud 30. Each of the inner shrouds carry on its inner diameter seal member 32 that is coated with an abradable material that engages the teeth of the labyrinth seal 34. The labyrinth seal 34 is connected for rotary motion to the rotor disks 14 via the extension arm 36. The seal obviously prevents the leakage upstream to a lower pressure area, requiring recompression and thus, representing a loss in efficiency. As shown in this prior art configuration the stator vanes are supported on both the inner and outer diameters.

Figure 2:
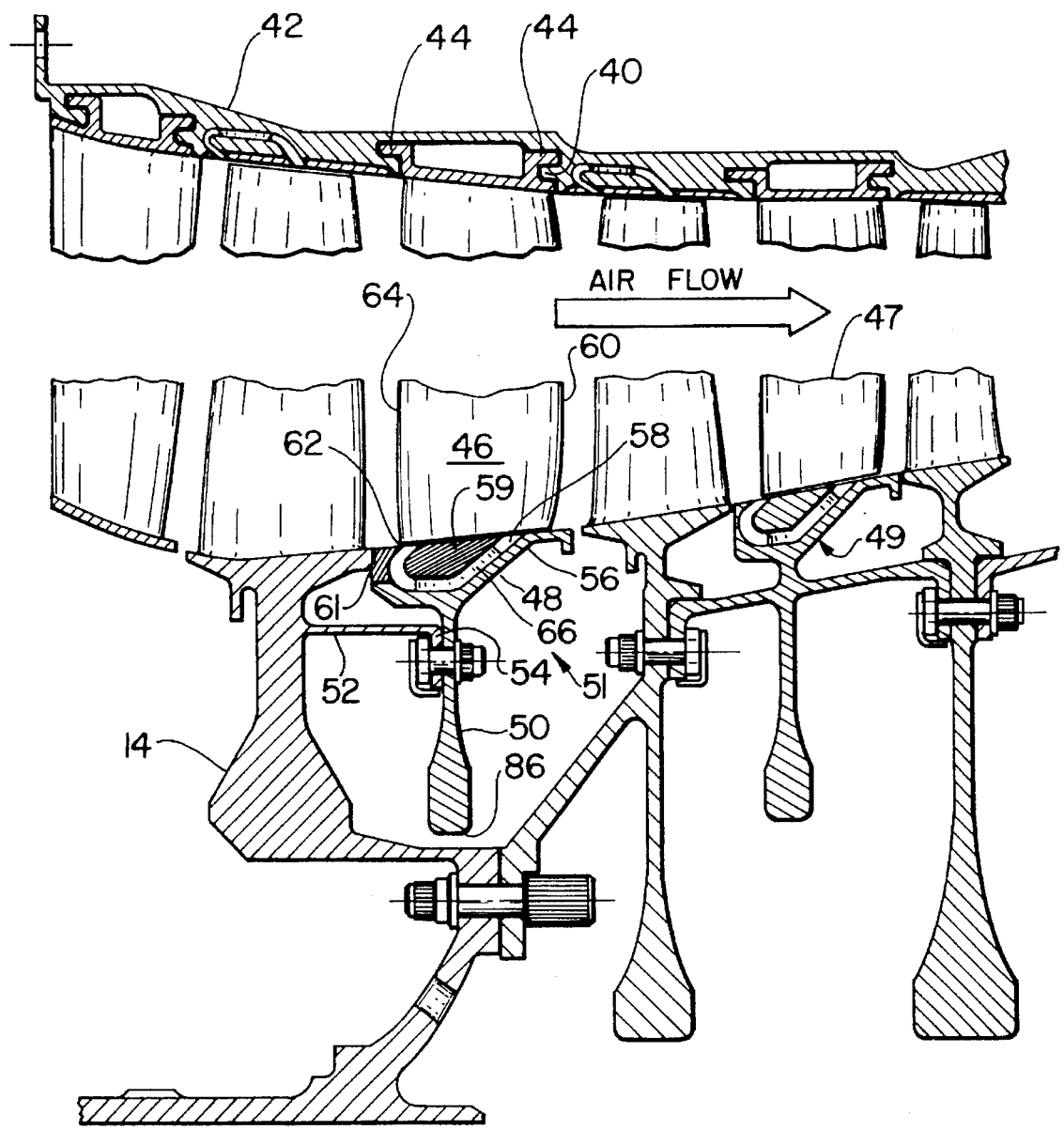
FIG. 2 is a fragmentary view of a compressor section incorporating the present invention.

Two embodiments of this invention are illustrated in FIG. 2 which discloses a sectional view of the vane passage hub treatment for the stators at different compression stages of the compressor section of the gas turbine engine. As noted from this Fig., the embodiment disclosed in the prior art configuration depicted in FIG. 1 has been modified to incorporate this invention. The stator vanes 28 disclosed in FIG. 1 are modified to be cantilever mounted instead of being supported on the inner and outer diameters. As noted from FIG. 2 the outer shroud 40 is attached to the outer casing 42 via the hooks 44 and the airfoils of the vanes extend toward the inner diameter and are disposed in close proximity to the hub 48. The construction of the vaned passage hub treatment generally indicated by reference numeral 49 of the last stator vane 47 is constructed from a single cast unit while the construction of the vaned passage hub treatment generally indicated by reference numeral 51 for stator vane 46 is formed from three separate rings as will be described in further details hereinbelow. It is to be understood however, that irrespective of the construction of the vaned passage hub treatment, the function and operation of any of the embodiments are identical to each other.

With respect to stator vane 46 in FIG. 2, the hub 48 comprises disc 50 attached to the rotor disk 14 (the same reference numerals for the like elements depicted in all the Figs. are used herein) via the shell 52 extending axially and carrying flange 54 which is in close proximity to disk 50. A plurality of circumferentially spaced nut and bolt assemblies (one being shown) rigidly attaches the hub 48 to disk 14 for rotation therewith. The vaned passage hub treatment consists of the passage 56 having inlet 58 located in proximity to trailing edge 60 of airfoil 46 and outlet 62 located in proximity to the leading edge 64 of airfoil 46. As was mentioned above, the inlet and outlet of the vaned passage is selected to assure that 1) the orientation of the air being rejected back into the gas path closely matches the main stream flow through the stator hub section and 2) only the low momentum flow of the main stream is recirculated.

A plurality of vanes 66 are circumferentilly spaced in the passage 56 and serve to remove the vortices of the low momentum flow being bypassed so that the velocity of the air being redirected into the maim stream via outlet 62 has the appropriate orientation with respect to mainstream flow in order to be reintroduced without imposing a drag to the main stream so as to avoid reducing the efficiency of the compressor. In other words, the vanes 66 serve to straighten the flow so that the flow stream will exhibit a smooth aerodynamic profile. The portion of passage 56 adjacent to the outlet 62 is curved such that the outlet is oriented to inject the bypassed air toward the aft direction of the gas path which essentially is in the direction of flow of the main stream. The construction of the vaned passage treatment which includes the cap 59, hub 48 and forward retainer 61 will be described in further detail in the description to follow immediately below.

The vaned passage hub treatment of the preferred embodiment of this invention is fabricated in essentially three rings 1) the hub which may be a portion of a disk, 2) the cap and 3) the forward retainer. Each of these components are fabricated in a full hoop or ring. This is shown in both FIGS. 2 and 3 and the construction of the vaned passage treatment in both of these Figs. is the same. As noted in FIG. 3 the configuration of the hub is slightly different and the hub is attached to the aft rotor disk rather than the fore rotor disk, but the construction of and function of the vaned passage treatment are identical. The hub 70 has integrally formed therein the vanes 72 (one being shown) which are circumferentially spaced around the entire circumference of the hub ring. Cap 74, which is also a full ring is attached to the vanes 72, say by bonding or diffusion bonding as will be described hereinbelow. The outer diameter of cap 74 is contoured to define with the contour formed on the inner diameter of hub 70 the passage 76, and the inlet 78. The forward retainer 82 which may be bonded to the hub 70, say by diffusion bonding, is contoured to define with the cap 74 the outlet 80. The forward retainer 82 allows the installation of cap 74. The inner diameters of cap 74, hub 70 and forward retainer 82 that bound the main stream flow path and are in proximity to the outer tips of the stator vaned may be coated with a well known and suitable abrasive material so that tight clearances between the cantilevered stator vane end and rotating hub can be maintained. In the event of a rub, stator vane material will be removed instead of material from the rotating components in the vaned passage hub to ensure that the hub remains intact and in balance.

Figure 3:
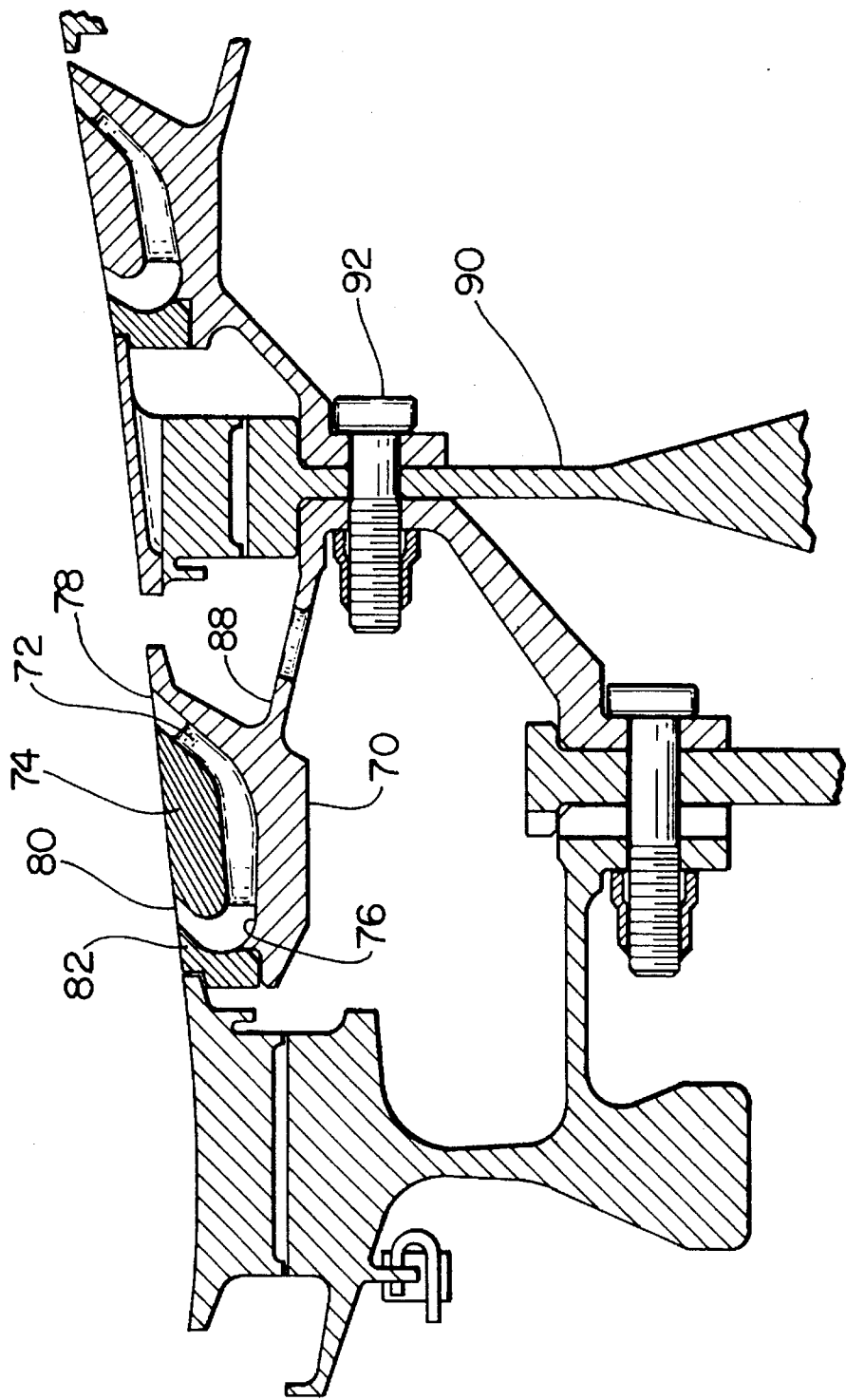
FIG. 3 is an enlarged view in section showing the details of one embodiment of the present invention.

As will be appreciated from the foregoing, the full ring cap 59 can support most of its own load which requires less weight in the hub bore 86 (FIG. 2). While the designs of the vaned passage hub treatments disclosed in FIG. 2 are more appropriate for an engine designed for flight operations, the design in FIG. 3 is more appropriate for lower speed applications, as for example, in rigs for compressors where the mechanical speed are lower than those encountered in engines. Since the cap 74 (FIG. 3) in this embodiment is self supporting, the disk bore of the type disclosed in FIG. 2 is not required. An additional advantage of the design in FIG. 3 is that the integral shell 88 that is attached to the rotor disk 90 by the plurality of circumferentially space nut and bolt assemblies 92 and hub 70 can be fabricated such that they are sufficiently flexible and match the radial deflection of cap 74. This construction allows the components to avoid tensile loads at the interface of the cap 74 and vanes 72, which ultimately simplifies the bond joints that are required in rig applications.

Figure 4:
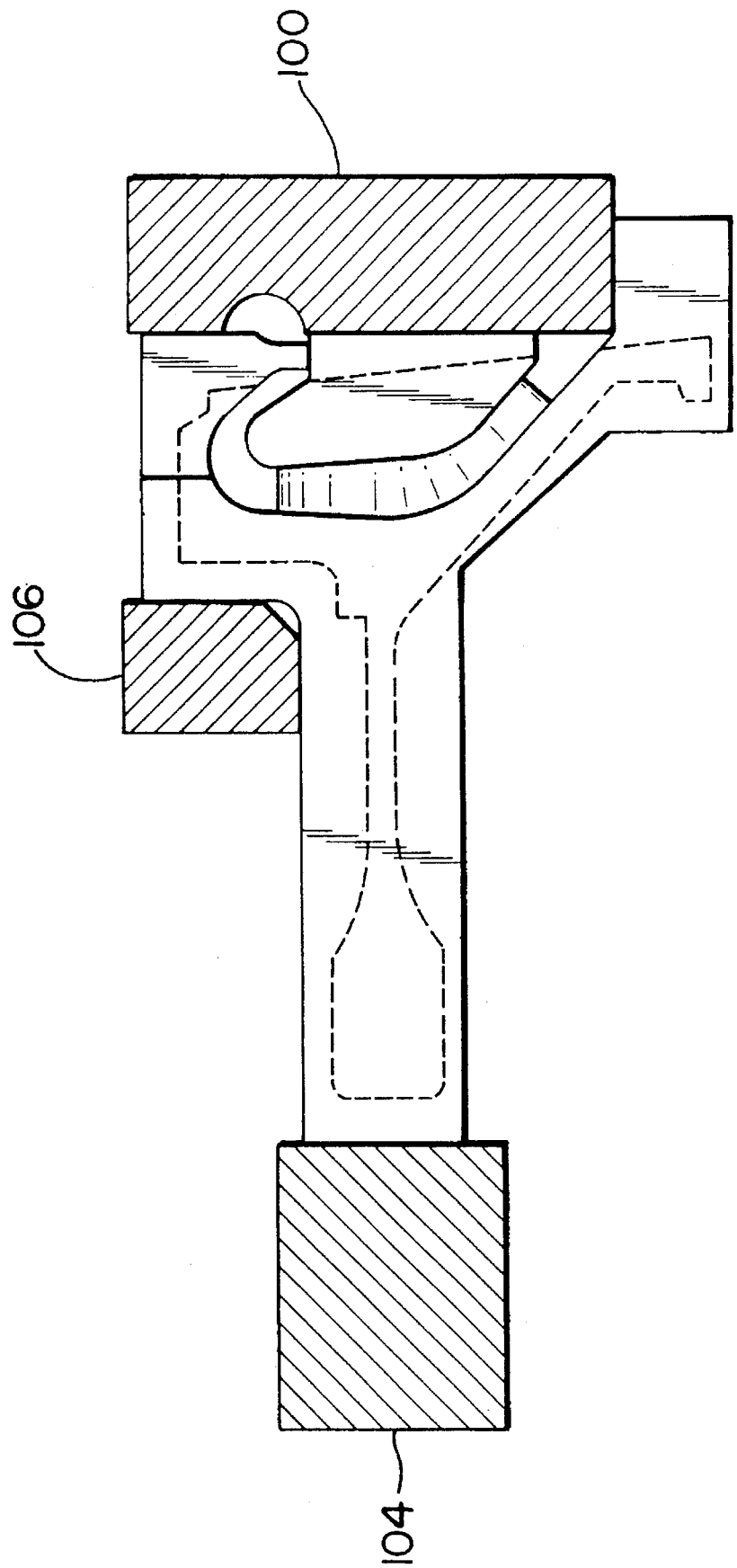
FIG. 4 is an enlarged view in section showing the details of another embodiment of this invention.

One method of manufacturing the vane passage hub treatment is disclosed in FIG. 4 which is a schematic illustration on how this invention takes advantage of the different rates of thermal expansion of the materials used in this process. The cap 59, hub 48 and forward retainer 61 in the embodiment depicted in FIG. 2 and the cap 74, hub 70 and forward retainer 82 depicted in FIG. 3 are fabricated from titanium or titanium alloy and preferably have a coefficient of expansion (alpha) of six (6) microinches per inch per degree Fahrenheit and are installed in the outer ring 100 which is made from, say Molybdenum or other element that exhibits an alpha of three (3). Obviously, the molybdenum with the lower alpha would expand less than the titanium cap when both are heated to a high temperature and hence, cause compression allowing diffusion bonding to occur at the interfaces between the vane ends and the respective caps. An additional intermediate ring 106 and inner ring 104 may as an option be applied to the areas depicted in FIG. 4 and these rings are made from a higher alpha than the titanium and serve to further increase the compression. A suitable material for rings 106 and 104 may be a nickel alloy with an alpha of nine (9) or other well known or suitable material. The tooling rings, i.e rings 100, 106 and 104 are sized to provide the compression required to allow diffusion bonding to take place.

Figure 5:
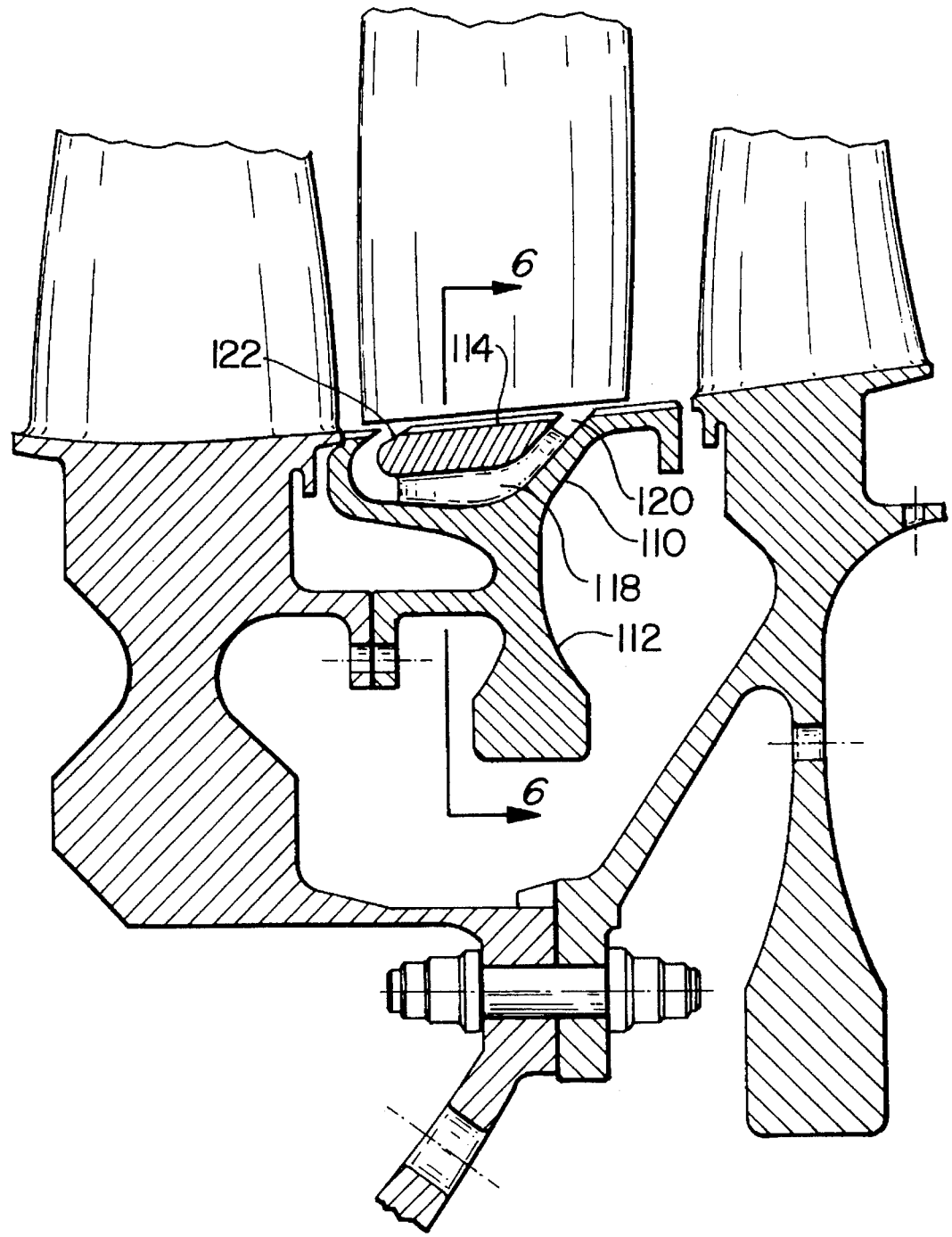
FIG. 5 is a sectional view on the invention illustrating the details of the method of fabricating one embodiment of the invention.
Figure 6:
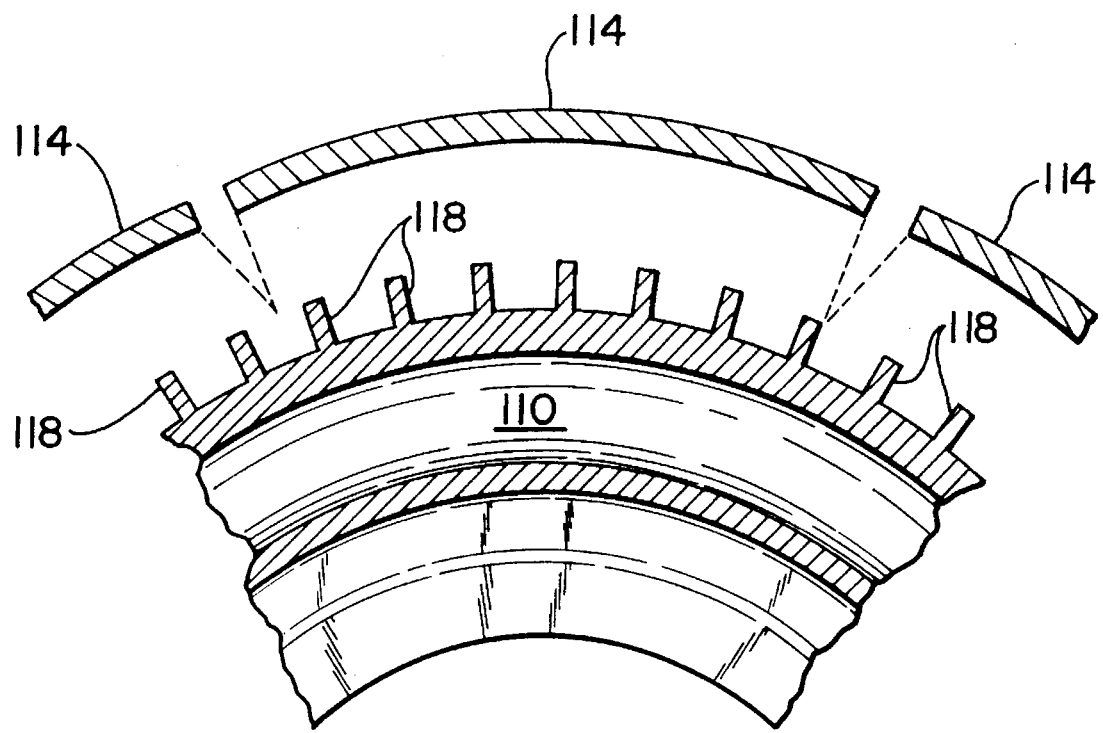
FIG. 6 is a partial exploded view in section taken along lines 6—6 of FIG. 5.

FIGS. 5 and 6 exemplifies another embodiment of this invention that fabricates the cap into annular segments and avoids the requirement of the forward retainer. As noted in FIGS. 5 and 6, the hub 110 which is integral with the disk 112, and cap 114 define the vaned passage hub treatment. The plurality of vanes 118 are integrally formed in the inner diameter of hub 110 and this configuration with the cap 114 defines the passage 118, inlet 120 and outlet 122. The vaned passage hub treatment of this embodiment serves the same functions as the embodiments depicted in FIGS. 2 and 3. The cap 114 and the individual segments in the embodiment in FIGS. 4 and 5 are joined by diffusion bonding similarly to the diffusion bonded technique described immediately above.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. For a compressor that pressurizes a main flow stream of a gas turbine engine having a compressor case, a rotor, a fixed stator supported in said compressor case, a plurality of circumferentially spaced vanes directing the flow of said main flow stream and having an outer diameter and an inner diameter, the outer diameter of each of said vanes being affixed to said stator to define cantilevered mounted vanes, each of said vanes having a relatively flat tip portion, a leading edge and a trailing edge, a rotating hub attached to said rotor and being rotated thereby and being mounted adjacent to said tip portion of each of the vanes, said rotating hub having an inner surface throughout its extent being in parallel relationship to said tip portion, a portion of the main air stream having a high momentum flow component and a low momentum flow component flowing between said tip portion and said inner surface of said rotating hub, means in said rotating hub for removing said low momentum flow component and treat said low momentum flow component and return the treated low momentum flow component back into said portion of the main air stream, said means including an annular passage formed in said rotating hub having an inlet adjacent to said trailing edge and an outlet adjacent to said leading edge, said inlet and said outlet extending between said leading edge and said trailing edge whereby the stall margin of said compressor is enhanced without imparting a penalty to the efficiency of said compressor.

2. For the compressor of a gas turbine engine as claimed in claim 1 including a plurality of circumferentially spaced flow-straightening vanes in said annular passage.

3. For the compressor of a gas turbine engine as claimed in claim 2 including a pair of axially spaced rotors mounted in said compressor case and one rotor of said pair of axially spaced rotors being mounted upstream of said stator and the other rotor of said pair of axially spaced rotors being mounted downstream of said stator relative to the flow of said main air stream, said rotating hub being attached to one rotor of said pair of rotors and being rotated thereby.

4. For the compressor of a gas turbine engine as claimed in claim 3 wherein said rotating hub and said flow straightening vanes in said annular passage are cast in a single unit.

5. For the compressor of a gas turbine engine as claimed in claim 4 wherein said rotating hub includes an outer diameter, the portion of said rotating hub disposed adjacent to the inner diameter of each of said cantilevered vanes is coated with an abradable material whereby the material of said cantilevered vanes will rub off in the event of a rub between the rotating hub and said cantilevered vanes.

6. For the compressor of a gas turbine engine as claimed in claim 3 wherein said flow-straightening vanes are formed integrally in said rotating hub and include a top surface and said rotating hub is contoured to define a portion of said annular passage and said inlet, an annular cap supported to said top surface of said flow-straightening vanes and defining with said rotating hub another portion of said annular passage and said inlet, and an annular support ring mounted axially upstream of said annular cap with respect to the flow of said main air stream, and defining with said rotating hub and said annular cap, said outlet.

7. For the compressor of a gas turbine engine as claimed in claim 6 wherein said rotating hub, said annular cap and said annular support ring defining a contoured outer surface in planar alignment and said outer surface having a coating of abrasive material thereon that is adjacent to the inner diameter of each of said vanes in said stator.

8. For the compressor of a gas turbine engine as claimed in claim 7 wherein said annular cap is formed from a plurality of segments attached end to end to form a ring.

\* \* \* \* \*